US009984667B2

(12) United States Patent
Walker (10) Patent No.: US 9,984,667 B2
(45) Date of Patent: May 29, 2018

(54) GUITAR STAND MOUNTING SYSTEM

(71) Applicant: Gordon L. Walker, Valley Springs, CA (US)

(72) Inventor: Gordon L. Walker, Valley Springs, CA (US)

( * ) Notice: Subject to any disclaimer, the term of this patent is extended or adjusted under 35 U.S.C. 154(b) by 118 days.

(21) Appl. No.: 15/265,063

(22) Filed: Sep. 14, 2016

(65) Prior Publication Data

US 2017/0309262 A1    Oct. 26, 2017

Related U.S. Application Data

(60) Provisional application No. 62/326,117, filed on Apr. 22, 2016.

(51) Int. Cl.
 *G10G 5/00* (2006.01)
 *A47B 81/00* (2006.01)
 *F16M 11/28* (2006.01)
 *F16M 13/02* (2006.01)
 *F16M 11/04* (2006.01)

(52) U.S. Cl.
 CPC ............. *G10G 5/00* (2013.01); *A47B 81/005* (2013.01); *F16M 11/041* (2013.01); *F16M 11/28* (2013.01); *F16M 13/02* (2013.01)

(58) Field of Classification Search
 CPC ....................................................... G10G 5/00
 See application file for complete search history.

(56) References Cited

U.S. PATENT DOCUMENTS

| | | | | |
|---|---|---|---|---|
| 3,664,224 A | * | 5/1972 | Campagna, Jr. | G10G 5/00 248/230.8 |
| 3,765,633 A | * | 10/1973 | Caudill | G10G 5/00 24/457 |
| 4,986,158 A | * | 1/1991 | Johnson | F16M 11/22 84/327 |
| 5,313,866 A | * | 5/1994 | Smith | G10G 5/00 248/121 |
| 5,876,050 A | * | 3/1999 | Berger | B62B 3/006 248/130 |
| 8,055,008 B1 | * | 11/2011 | Davis | G10G 5/00 381/120 |
| 8,701,900 B2 | * | 4/2014 | Childers | G10G 5/00 181/199 |
| 8,708,167 B2 | * | 4/2014 | Mone | G10G 5/00 211/85.6 |
| 9,564,111 B2 | * | 2/2017 | Hankins | G10G 5/00 |
| 2017/0309262 A1 | * | 10/2017 | Walker | G10G 5/00 |

FOREIGN PATENT DOCUMENTS

WO    WO 2007107172 A1 *    9/2007    ............... G10G 5/00

* cited by examiner

*Primary Examiner* — Robert W Horn (57) ABSTRACT

A guitar stand which is capable of being mounted onto the side handle of an amplifier, while also being capable of being mounted onto a multi-guitar adapter and an amplifier connector. The multi-guitar adapter and guitar stand can be attached onto the side handle of the amplifier. The multi guitar amplifier is capable of having a first and a second guitar stand mounted onto it while attached to an amplifier. The amplifier connector attaches onto the top of an amplifier and is capable of having a single guitar stand mounted onto it.

14 Claims, 9 Drawing Sheets

GUITAR STAND MOUNTING SYSTEM

The current application claims a priority to the U.S. Provisional Patent application Ser. No. 62/326,117 filed on Apr. 22, 2016.

FIELD OF THE INVENTION

The present invention relates to guitar stands. In particular, the present invention relates to a system that allows a guitar stand to mount on to an amplifier, speaker, or similar device.

BACKGROUND OF THE INVENTION

Guitars are electric or acoustic string instruments used in a multitude of musical genres, such as rock, jazz, reggae, blues, metal, and more. These instruments are often carried in soft or hard bodied cases and placed on guitar stands when not in use or being transported. The problem with guitar stands is that they are easily knocked over, which in turn, can easily damage the instrument. Cheaper guitars may cost as low as 50-100$, however, more expensive models can easily be priced at several thousand dollars. As such, there exists a need for a guitar stand assembly which drastically reduces the likely hood of being tipped over if knocked into.

It is therefore an objective of the present invention to introduce a guitar stand mounting system. The present invention includes the use of a mountable guitar stand that may attach onto a handle on the side of an amplifier or similar device (e.g. speaker, etc.). The guitar stand may also mount onto a dual guitar adapter or onto a top securing assembly. The dual guitar adapter may attach onto the handle of an amplifier, while being capable of having two separate guitar stands mounted onto it. The top securing assembly attaches onto the top of a guitar amplifier or similar device and is capable of having a single guitar stand mounted onto it. As such, the present invention provides a system that allows the guitar stand to be mounted onto an amplifier in three different ways. Use of the present invention secures the stand to the amplifier, preventing it from disconnecting or tipping over if knocked into. Overall, the present invention is practical, sturdy, safe, and effective.

DETAIL DESCRIPTIONS OF THE INVENTION

All illustrations of the drawings are for the purpose of describing selected versions of the present invention and are not intended to limit the scope of the present invention.

Figure 1:
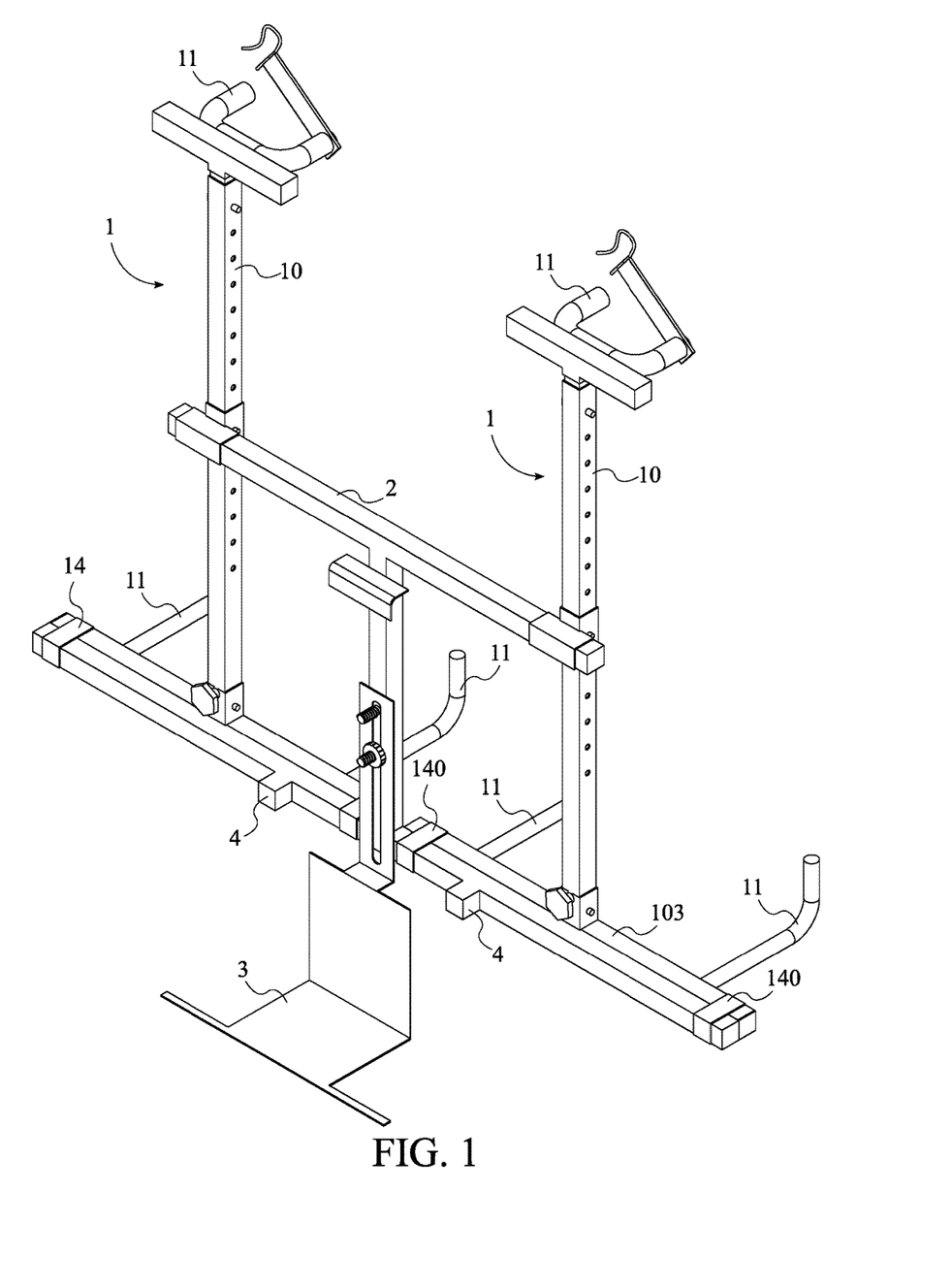
FIG. 1 is a rear perspective view of the present invention. In this rear perspective view, the at least one guitar stand is mounted onto the stand rack. Additionally, the amp fastening mechanism is mounted onto the stand rack, opposite to the at least one guitar stand.

In reference to FIG. 1, the preferred embodiment of the present invention is a guitar stand that can be connected to a guitar amp. The present invention is a device that enables a user to mount multiple guitar stands onto other pieces of equipment including, but not limited to, amps, boxes, and tables. The present invention comprises an at least one guitar stand 1, a stand rack 2, and an amp fastening mechanism 3. The guitar stand 1 is a device used to support a guitar that is not in use. The guitar stand 1 comprises a stand frame 10 and a guitar rest 11. The stand frame 10 is the structural base of the guitar stand 1 that provides its overall shape so that guitar rest 11 is able to maintain a guitar in a desired orientation. The guitar rest 11 is connected adjacent to the stand frame 10 so that the guitar stand 1 is able to securely hold an attached guitar that is not in use. The stand rack 2 is detachably attached adjacent to the stand frame 10, opposite the guitar rest 11. As a result, the stand rack 2 is able to support the guitar stand 1 while the guitar stand 1 is attached to a guitar. The amp fastening mechanism 3 is mounted adjacent to the stand rack 2, opposite the stand frame 10. Consequently, the amp fastening mechanism 3 is used to attach the stand rack 2 onto guitar amps.

In reference to FIG. 1 a first alternative embodiment, the at least one guitar stand 1 is a plurality of guitar stands 1. This plurality of guitar stands 1 is distributed across the stand rack 2. As a result, the present invention is able to simultaneously support multiple guitars.

Figure 2:
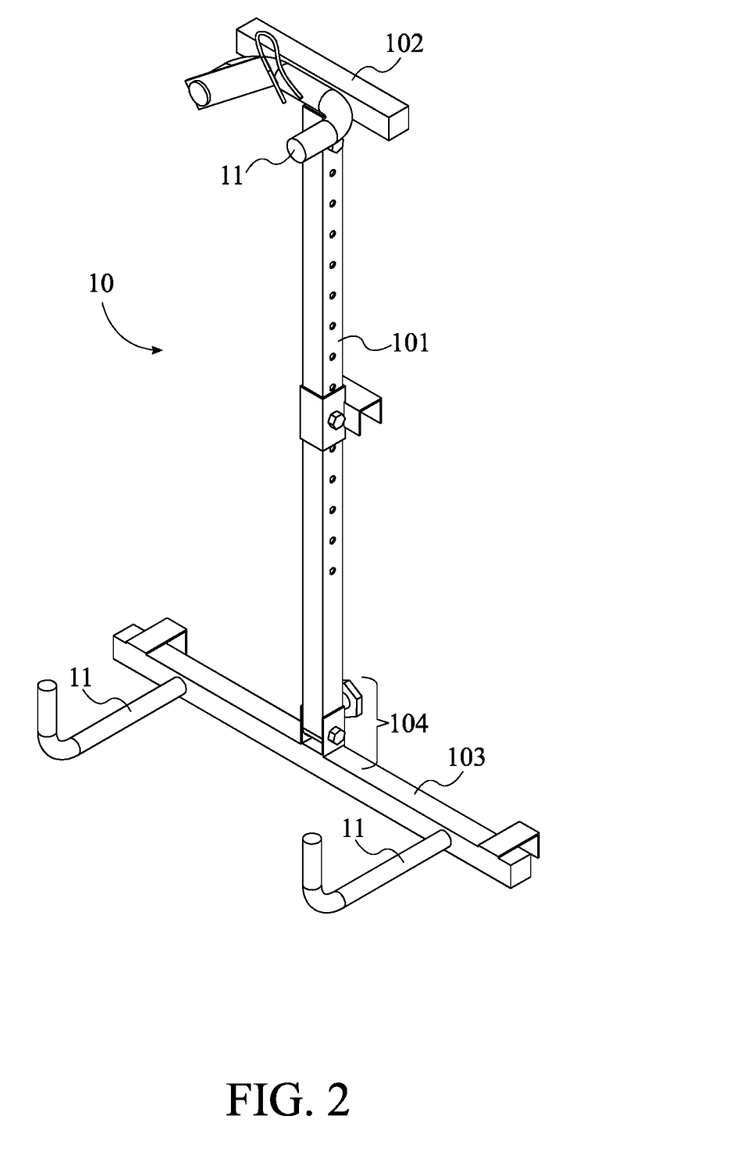
FIG. 2 is a front perspective view of the guitar stand. In this view the pivot-and-lock mechanism is engaged. As a result, the first guitar-base support and the second guitar-base support are positioned to receive the base of a guitar.

In reference to FIG. 2, in the preferred embodiment of the present invention, the stand frame 10 is a rigid I-shaped structure. The stand frame 10 comprises a vertical beam 101, an upper horizontal beam 102, a lower horizontal beam 103, and a pivot-and-lock mechanism 104. The upper horizontal beam 102 is terminally and detachable attached to the vertical beam 101. As a result, the upper horizontal beam 102 can be removed to facilitate transport and storage of the guitar stand 1. The lower horizontal beam 103 is terminally and detachably attached to the vertical beam 101, opposite to the upper horizontal beam 102. Consequently, the stand frame 10 is able to maintain an I-shaped configuration when both the upper horizontal beam 102 and the lower horizontal beam 103 are attached to the vertical beam 101. The pivot-and-lock mechanism 104 is integrated into the terminal attachment between the lower horizontal beam 103 and the vertical beam 101 so that the lower horizontal beam 103 is able to pivot about the terminal attachment with the vertical beam 101. Additionally, the lower horizontal beam 103 can be detached from the vertical beam 101 when the pivot-and-lock mechanism 104 is disengaged.

Figure 3:
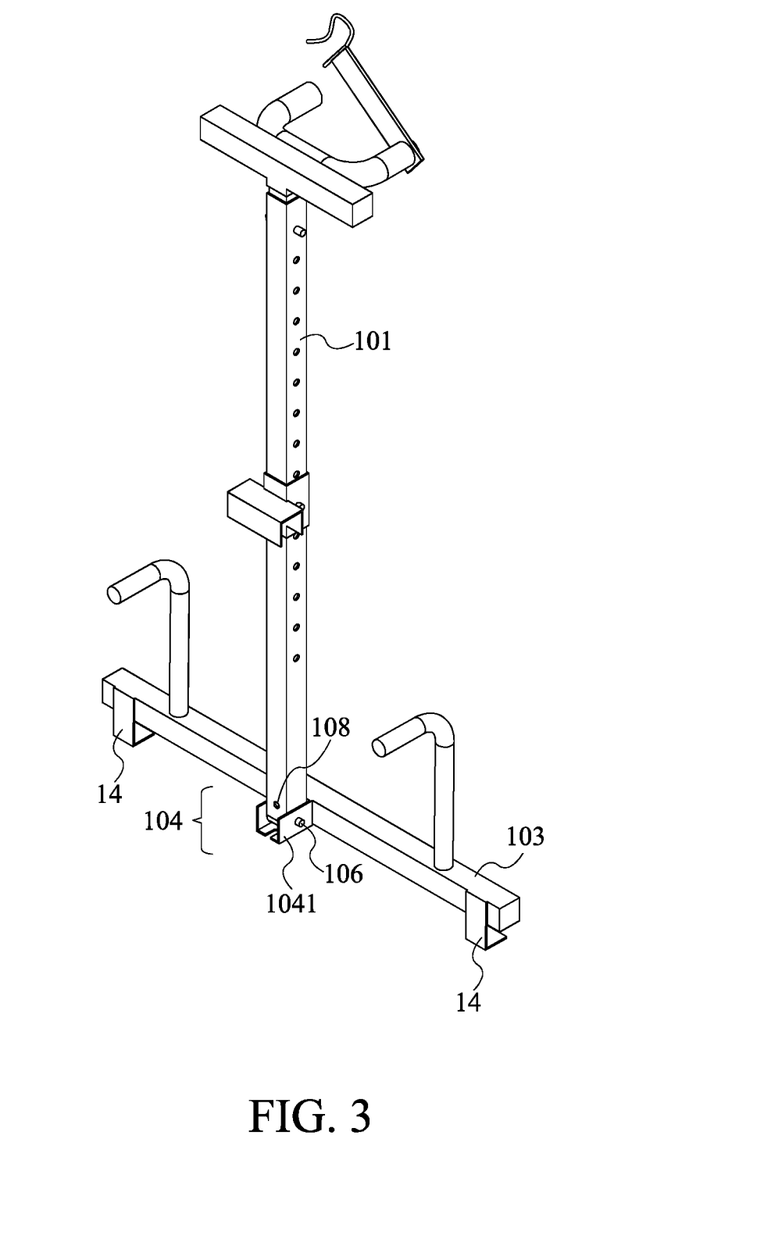
FIG. 3 is a rear perspective view of the guitar stand. In this view the pivot-and-lock mechanism is disengaged. As a result, the first guitar-base support and the second guitar-base support are not positioned to receive the base of a guitar.
Figure 4:
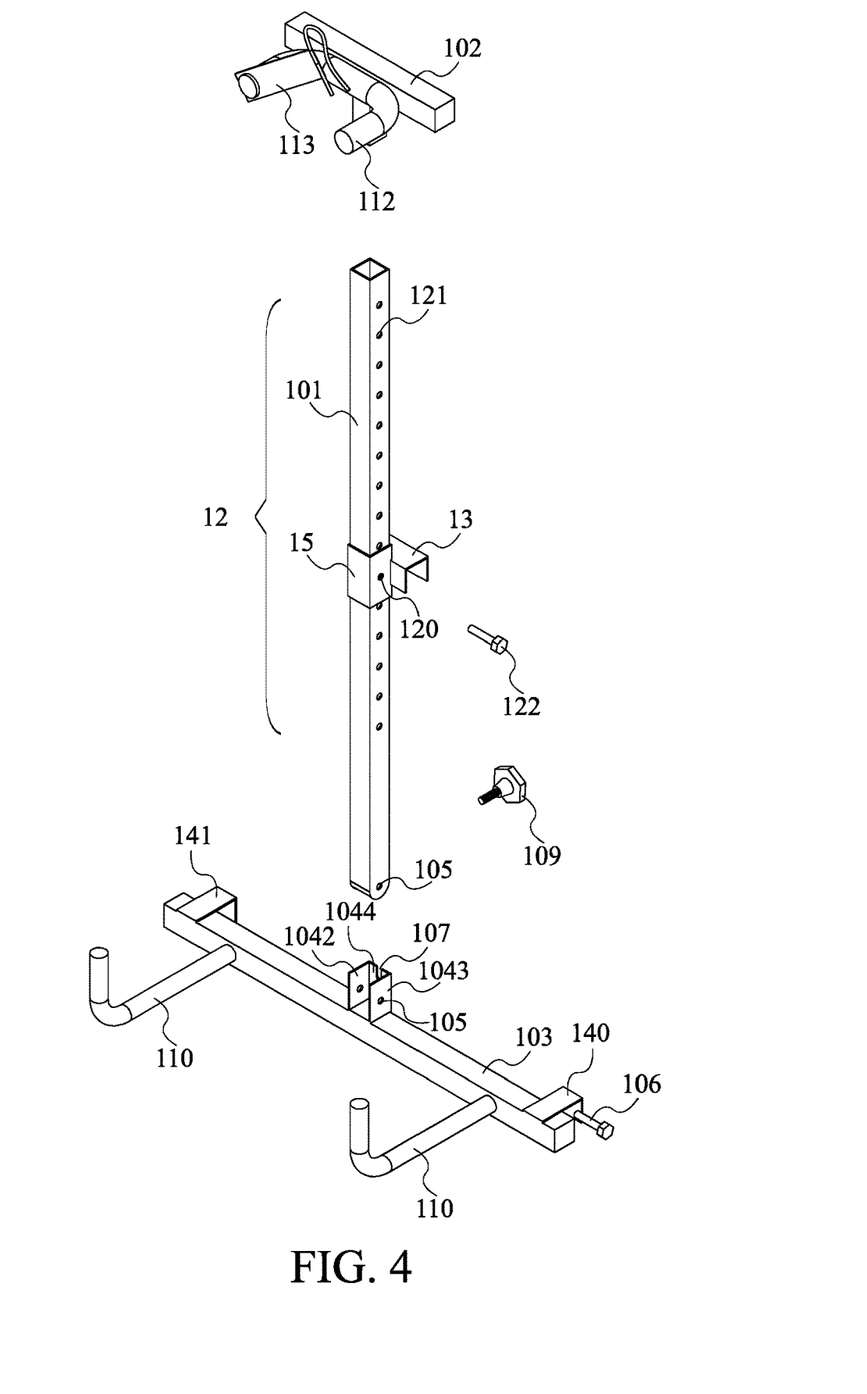
FIG. 4 is an exploded perspective view of the guitar stand.

In reference to FIG. 3 and FIG. 4, in the preferred embodiment of the present invention, the pivot-and-lock mechanism 104 comprises a pivot bracket 1041, a pivot hole 105 and a pivot pin 106. This configuration enables the pivot-and-lock mechanism 104 to function as a user actuated mounting system that enables the lower horizontal beam 103 to pivot about, and become detached from, the terminal attachment to the vertical beam 101. The pivot bracket 1041 is a rigid U-shaped member that extends from the lower horizontal beam 103 so that the pivot-and-lock mechanism 104 can connect the lower horizontal beam 103 to the vertical beam 101. The pivot bracket 1041 comprises a first leg 1042, a second leg 1043, and a back panel 1044. The back panel 1044 is adjacently and perpendicularly connected to the lower horizontal beam 103 so that the back panel 1044 is able to act as a stop member which restricts the pivoting motion of the lower horizontal beam 103 about the terminal attachment with the vertical beam 101. The first leg 1042 being adjacently and perpendicularly connected to the back panel 1044. The second leg 1043 being perpendicularly connected to the back panel 1044, opposite the first leg 1042. The arrangement of the back panel 1044, the first leg 1042, and the second leg 1043 creates a three-sided pivot bracket 1041 so that the terminal connection between the lower horizontal beam 103 and the vertical beam 101 is a pivoting mount. The vertical beam 101 is positioned in between the first leg 1042 and the second leg 1043. The pivot hole 105 traverses through the first leg 1042, through the vertical beam 101, and through the second leg 1043 so that there is a channel into which the pivot pin 106 can be inserted. The pivot hole 105 is positioned parallel to the lower horizontal beam so that the lower horizontal beam 103 remains perpendicular to the vertical beam 101 while pivoting. The pivot pin 106 traverses through the pivot hole 105. Consequently, the pivot pin 106 is the axis about which the lower horizontal beam 103 pivots. A user is able to remove the pivot pin 106 to disconnect the pivot-and-lock mechanism 104; thus detaching the lower horizontal beam 103 from the vertical beam 101.

In reference to FIG. 3 and FIG. 4, in the preferred embodiment of the present invention, the pivot-and-lock mechanism comprises a pivot bracket 1041, a fastener slot 107, a female-threaded hole 108, and a male-threaded fastener 109. A first end of the vertical beam 101 is pivotably mounted into the pivot bracket 1041, as described above. The female-threaded hole 108 laterally traversing into the vertical beam 101, adjacent to the first end of the vertical beam 101. As a result, the female-threaded hole 108 is able to engage with the male-threaded fastener 109, once inserted. The fastening slot traversing through the pivot bracket 1041, concentric to the female-threaded hole 108 so that the male-threaded fastener 109 can lock the pivot bracket 1041 in place; thus engaging the pivot-and-lock mechanism 104. The male-threaded fastener 109 is positioned through the fastener slot 107. The male-threaded fastener 109 engages into the female-threaded hole 108. Consequently, the male-threaded fastener 109 is used to engage the lock of the pivot-and-lock mechanism 104 when the male-threaded fastener 109 is engaged into the female-threaded hole 108.

In reference to FIG. 2, in the preferred embodiment of the present invention, the guitar rest 11 is a support system that enables the guitar stand 1 to cradle a guitar. The guitar rest 11 comprises a first guitar-base support 110 and a second guitar-base support 111. The first guitar-base support 110 and the second guitar-base support 111 are adjacently connected to the lower horizontal beam 103 of the stand frame 10. As a result, a user is able to rest the base of a guitar onto the first guitar-base support 110 and the second guitar-base support 111. The first guitar-base support 110 and the second guitar-base support 111 are positioned opposite to each other along the lower horizontal beam 103. Consequently, the first guitar-base support 110 and the second guitar-base support 111 are able to evenly distribute the weight of an attached guitar. In a second alternative embodiment, the first guitar-base support 110 and the second guitar-base support 111 are covered in a padding so that an attached guitar is protected from pressure damage.

Figure 5:
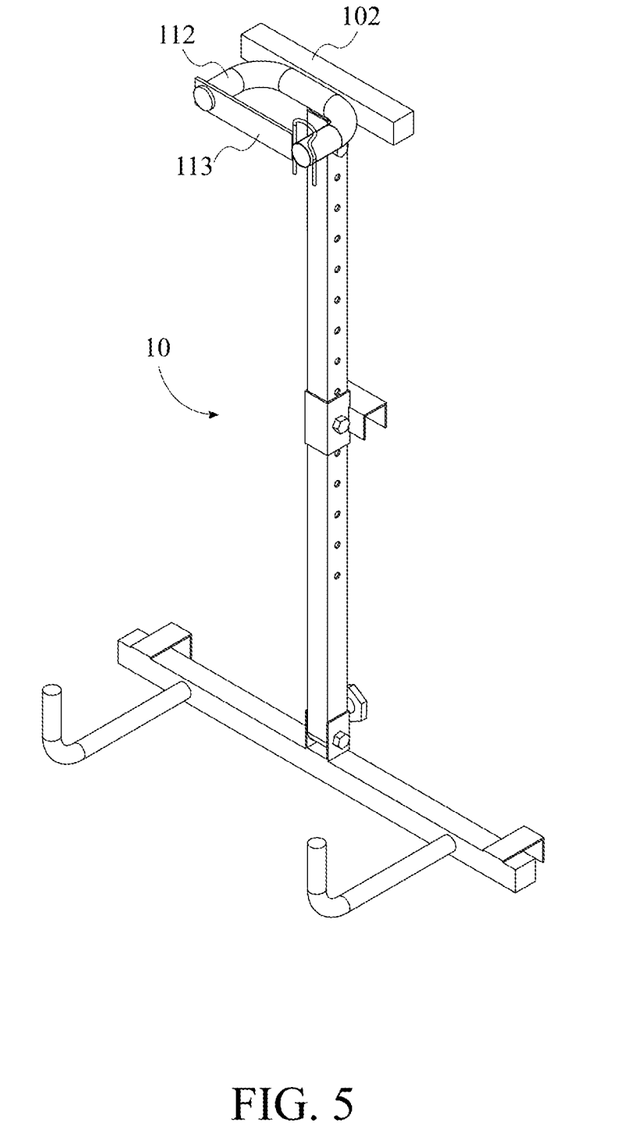
FIG. 5 is a separate front perspective view of the guitar stand. In this view the retaining mechanism is attached across the open end of the neck-receiving brace.
Figure 6:
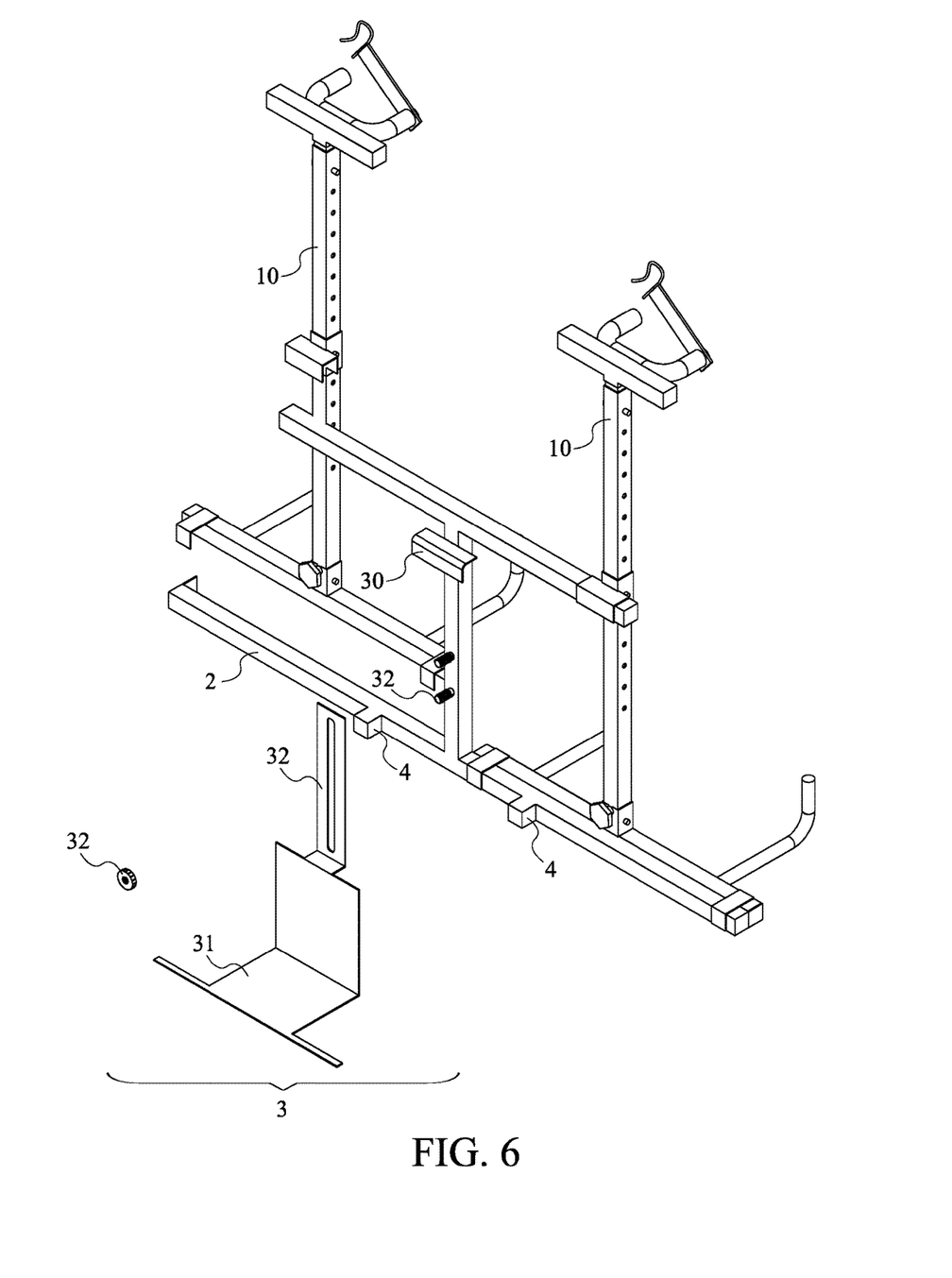
FIG. 6 is an additional rear perspective view of the present invention. In this rear perspective view, the at least one guitar stand is mounted onto the stand rack. Additionally, the amp fastening mechanism and one of the guitar stands in the at least one guitar stands are disconnected the stand rack.
Figure 7:
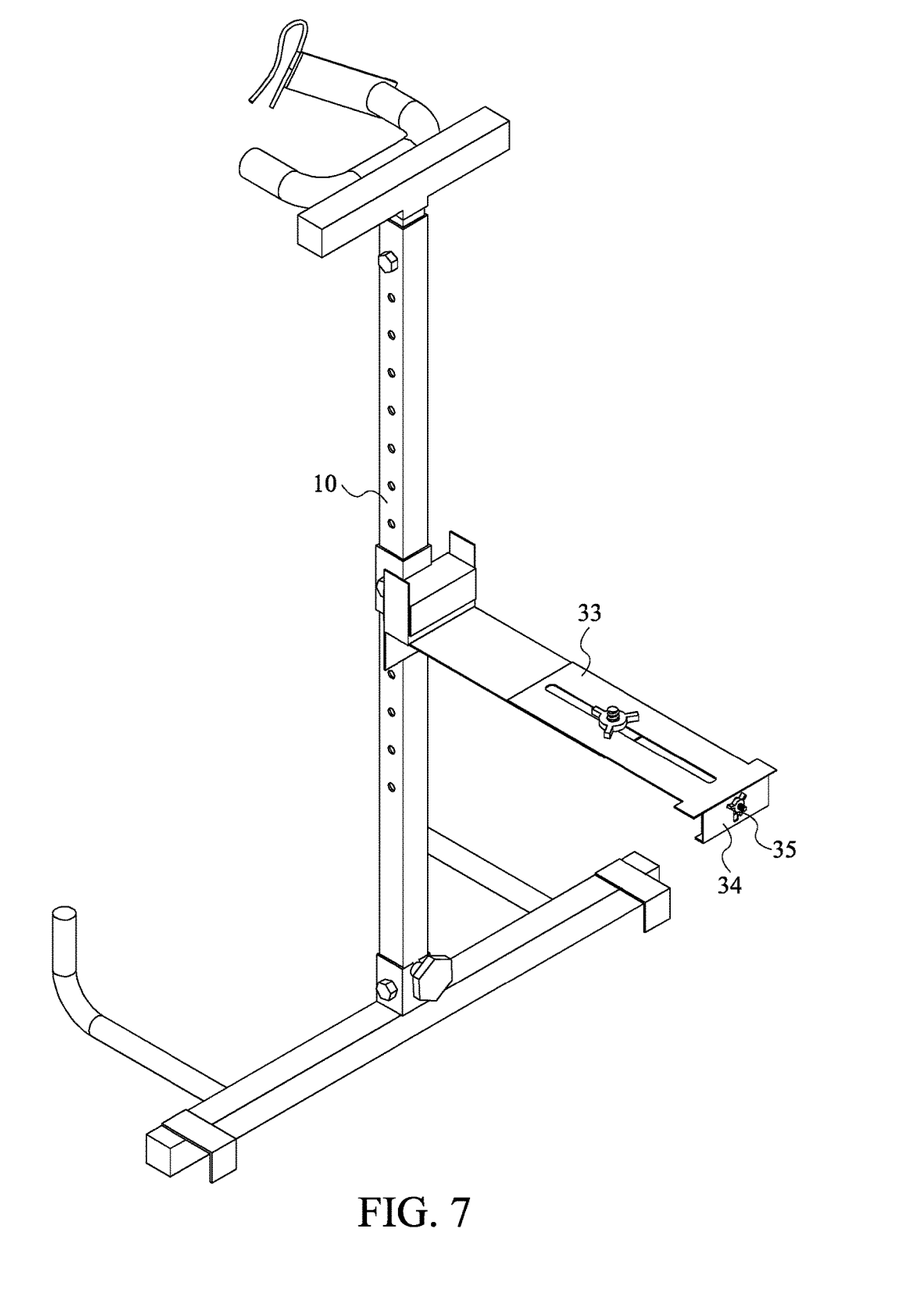
FIG. 7 is a further rear perspective view of the present invention. In this rear perspective view, the amp fastening mechanism is attached to the guitar stand.
Figure 8:
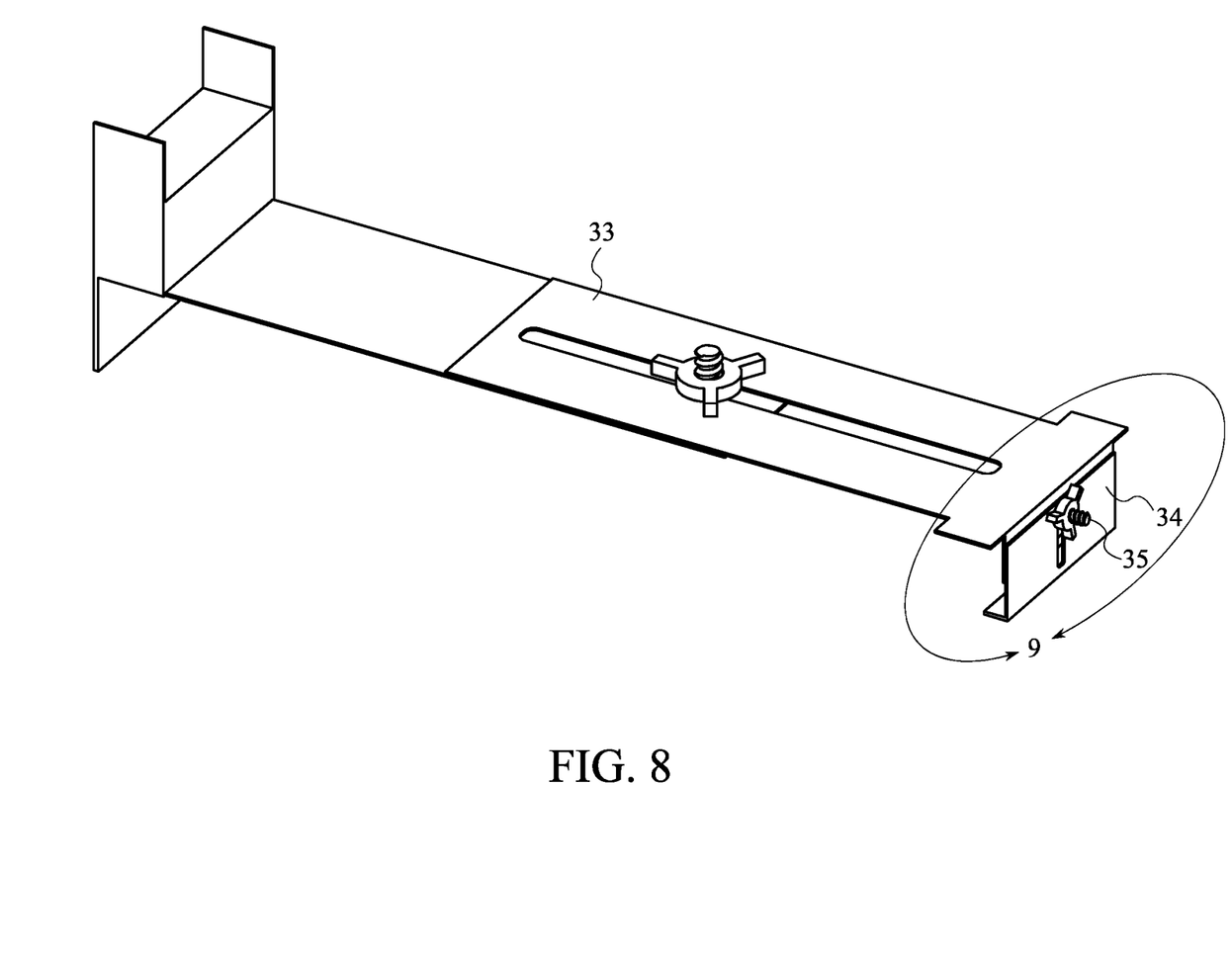
FIG. 8 is a perspective view on one embodiment of the amp fastening mechanism
Figure 9:
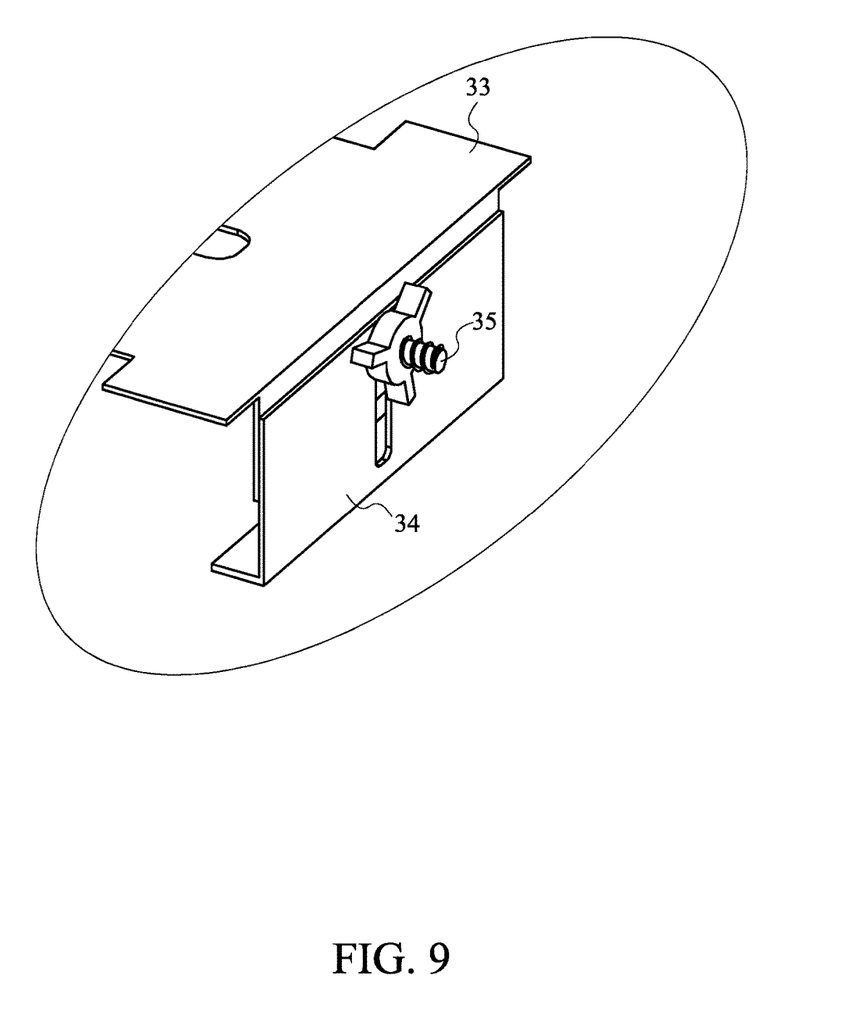
FIG. 9 is a detailed view of the adjustable length cantilever, the top edge hook, and the hook adjustment mechanism taken along circle 7 in FIG. 8.

In reference to FIG. 5, in the preferred embodiment of the present invention, the guitar rest 11 comprises a neck-receiving brace 112 and a retaining mechanism 113 so that the guitar rest 11 is able to support the neck of a guitar. The neck-receiving brace 112 is adjacently connected to the upper horizontal beam 102 of the stand frame 10. As a result, the neck-receiving brace 112 is able to cradle the neck of a guitar. The retaining mechanism 113 is detachably attached across the opening of the neck-receiving brace 112. Consequently, the retaining mechanism 113 is used to prevent the neck of a guitar from falling out of the neck-receiving brace 112. In the second alternative embodiment, the neck-receiving brace 112 is covered in a padding so that the attached guitar is protected from any pressure damage. Additionally, in this embodiment, the retaining mechanism 113 is a flexible ribbon of material that can be latched across the opening of the neck-receiving brace 112.

In reference to FIG. 3 and FIG. 4, in the preferred embodiment of the present invention, the guitar stand 1 further comprises a slide locking mechanism 12, a movable bracket 13, and at least one fixed bracket 14. The slide locking mechanism 12 is integrated along a vertical beam 101 of the stand frame 10 so that a user is able to lock the movable bracket 13 into a desired position along the vertical beam 101. The movable bracket 13 is slidably mounted along the vertical beam 101 of the stand frame 10. Consequently, the movable bracket 13 can be repositioned along the length of the vertical beam 101. The slide locking mechanism 12 is engaged to the movable bracket 13 so that, while engaged, the slide locking mechanism 12 is able to restrict the movement of the movable bracket 13. The at least one fixed bracket 14 is adjacently connected to a lower horizontal beam 103 of the stand frame 10. Consequently, the at least one fixed bracket 14 and the movable bracket 13 work in conjunction to detachably attach the guitar stand 1 to the stand rack 2.

In reference to FIG. 3 and FIG. 4, in the preferred embodiment of the present invention, the guitar stand 1 further comprises a bracket carriage 15. The bracket carriage 15 is a collar that slides along the vertical beam 101. The slide locking mechanism 12 comprises a carriage hole 120, a plurality of locking holes 121, and a locking pin 122. The bracket carriage 15 sleeves the vertical beam 101 of the stand frame 10 so that a user is able to reposition the bracket carriage 15 along the vertical beam 101. The movable bracket 13 is laterally connected to the bracket carriage 15 so that repositioning the bracket carriage 15 also moves the movable bracket 13 along the vertical beam 101. The carriage hole 120 laterally traverses through the bracket carriage 15 so that the locking pin 122 can be inserted through the carriage hole 120. The plurality of locking holes 121 laterally traverses through the vertical beam 101 of the stand frame 10 so that the locking pin 122 can be inserted through the plurality of locking holes 121, and pass through the vertical beam 101. The plurality of locking holes 121 is distributed along the vertical beam 101 of the stand frame 10. Consequently, the locking pin 122 can pass through the vertical beam 101 at a plurality of locations. The carriage hole 120 is concentrically aligned with a desired locking hole from the plurality of locking holes 121 so that the locking pin 122 is able to pass through the carriage hole 120 and a desired hole from the plurality of locking holes 121. The locking pin 122 is able to engage the carriage hole 120 and the desired locking hole. As a result, the locking pin 122 is able to restrict the movement of the bracket carriage 15 until the locking pin 122 is removed.

In reference to FIG. 1, in the preferred embodiment of the present invention, the at least one fixed bracket 14 comprises a first fixed bracket 140 and a second fixed bracket 141. The first fixed bracket 140 and the second fixed bracket 141 are rigid hooks which are positioned opposite to each other along the lower horizontal beam 103 of the stand frame 10. Consequently, the stand frame 10 is able to use the first fixed bracket 140 and the second fixed bracket 141 to attach to the stand rack 2.

In reference to FIG. 1, the stand rack 2 further comprises at least one bumper 4. The at least one bumper 4 is a pliant piece of materials that is mounted in between the stand rack 2 and the amp fastening mechanism 3. As a result, the at least one bumper 4 is used to prevent the stand rack 2 from damaging a guitar amp to which it is attached.

In reference to FIG. 6, FIG. 7, FIG. 8, and FIG. 9, in the preferred embodiment of the present invention, the amp fastening mechanism 3 is a detachable device that is used to connect the stand rack 2 to a guitar amp. The amp fastening mechanism 3 comprises a handle grasp 30, a bottom brace 31, and a height adjustment mechanism 32. The bottom brace 31 is a rigid L-shaped bracket that is mounted onto the stand rack 2 by the height adjustment mechanism 32. As a result, the user is able to adjust the height of the stand rack 2; thus enabling the present invention to be attached to guitar amps of varying shape and size. The bottom brace 31 is positioned adjacent to the lower horizontal beam 103 of the stand frame 10. The handle grasp 30 is a hook that is positioned opposite to the bottom brace 31 across the stand rack 2. Consequently, the handle grasp 30 enables the present invention to grasp onto the handle of a guitar amp. In a third alternative embodiment, the amp fastening mechanism 3 comprises an adjustable-length cantilever 33 and a top edge hook 34. In this embodiment, the amp fastening mechanism 3 is used to clamp onto the top edge of a guitar amp. The top edge hook 34 is terminally connected to the adjustable-length cantilever 33 so that the amp fastening mechanism 3 can become attached to a guitar amp. The adjustable-length cantilever 33 is pivotably connected to the stand frame 10, opposite to the top edge hook 34. As a result, the amp fastening mechanism 3 is capable of being attached to guitar amps of varying shape and size. The top edge hook comprises a hook adjustment mechanism 35 which enables a user to fasten the top edge hook 34 onto amps with unique dimensions.

Although the invention has been explained in relation to its preferred embodiment, it is to be understood that many other possible modifications and variations can be made without departing from the spirit and scope of the invention as hereinafter claimed.

What is claimed is:

1. A guitar stand and mounting system comprises:
   an at least one guitar stand;
   a stand rack;
   an amp-fastening mechanism;
   the guitar stand comprises a stand frame and a guitar rest;
   the guitar rest being connected adjacent to the stand frame;
   the stand rack being detachably attached adjacent to the stand frame, opposite the guitar rest and;
   the amp-fastening mechanism being mounted adjacent to the stand rack, opposite to the stand frame.

2. The guitar stand and mounting system as claimed in claim 1 comprises:
   the at least one guitar stand being a plurality of guitar stands and;
   the plurality of guitar stands being distributed across the stand rack.

3. The guitar stand and mounting system as claimed in claim 1 comprises:
   the stand frame comprises a vertical beam, an upper horizontal beam, a lower horizontal beam, and a pivot-and-lock mechanism;
   the upper horizontal beam being terminally and detachably attached to the vertical beam;
   the lower horizontal beam being terminally and detachably attached to the vertical beam, opposite to the upper horizontal beam and;
   the pivot-and-lock mechanism being integrated into the terminal attachment between the lower horizontal beam and the vertical beam.

4. The guitar stand and mounting system as claimed in claim 3 comprises:
   the pivot-and-lock mechanism comprises a pivot bracket, a pivot hole, and a pivot pin;
   the pivot bracket comprises a first leg, a second leg, and a back panel;
   the back panel being adjacently and perpendicularly connected to the lower horizontal beam;
   the first leg being adjacently and perpendicularly connected to the back panel;
   the second leg being adjacently and perpendicularly connected to the back panel, opposite to the first leg;
   the vertical beam being positioned in between the first leg and the second leg;
   the pivot hole traversing through the first leg, through the vertical beam, and through the second leg and;
   the pivot hole being positioned parallel to the lower horizontal beam;
   the pivot pin traversing through the pivot hole.

5. The guitar stand and mounting system as claimed in claim 3 comprises:
   the pivot-and-lock mechanism comprises a pivot bracket, a fastener slot, a female-threaded hole, and a male-threaded fastener;
   a first end of the vertical beam being pivotably mounted into the pivot bracket;
   the female-threaded hole laterally traversing into the vertical beam, adjacent to the first end of the vertical beam;
   the fastener slot traversing through the pivot bracket, concentric to the female-threaded hole;
   the male-threaded fastener being positioned through the fastener slot and;
   the male-threaded fastener engaging the female-threaded hole.

6. The guitar stand and mounting system as claimed in claim 1 comprises:
   the guitar rest comprises a first guitar-base support and a second guitar-base support;
   the first guitar-base support and the second guitar-base support being adjacently connected to a lower horizontal beam of the stand frame and;
   the first guitar-base support and the second guitar-base support being positioned opposite to each other along the lower horizontal beam.

7. The guitar stand and mounting system as claimed in claim 1 comprises:
the guitar rest comprises a neck-receiving brace and a retaining mechanism;
the neck-receiving brace being adjacently connected to an upper horizontal beam of the stand frame and;
the retaining mechanism being detachably attached across an opening of the neck-receiving brace.

8. The guitar stand and mounting system as claimed in claim 1 comprises:
the guitar stand further comprises a slide locking mechanism, a movable bracket, and at least one fixed bracket;
the slide locking mechanism being integrated along a vertical beam of the stand frame;
the movable bracket being slidably mounted along the vertical beam of the stand frame;
the slide locking mechanism being engaged to the movable bracket and;
the at least one fixed bracket being adjacently connected to a lower horizontal beam of the stand frame.

9. The guitar stand and mounting system as claimed in claim 8 comprises:
the guitar stand further comprises a bracket carriage;
the slide locking mechanism comprises a carriage hole, a plurality of locking holes, and a locking pin;
the bracket carriage sleeving the vertical beam of the stand frame;
the movable bracket being laterally connected to the bracket carriage;
the carriage hole laterally traversing through the bracket carriage;
the plurality of locking holes laterally traversing through the vertical beam of the stand frame;
the plurality of locking holes being distributed along the vertical beam of the stand frame;
the carriage hole being concentrically aligned with a desired locking hole from the plurality of locking holes and;
the locking pin engaging the carriage hole and the desired locking hole.

10. The guitar stand and mounting system as claimed in claim 8 comprises:
the at least one fixed bracket comprises a first fixed bracket and a second fixed bracket and;
the first fixed bracket and the second fixed bracket being positioned opposite to each other along the lower horizontal beam of the stand frame.

11. The guitar stand and mounting system as claimed in claim 1 comprises:
at least one bumper and;
the at least one bumper being mounted in between the stand rack and the amp-fastening mechanism.

12. The guitar stand and mounting system as claimed in claim 1 comprises:
the amp fastening mechanism comprises a handle grasp, a bottom brace, and a height adjustment mechanism;
the bottom brace being mounted onto the stand rack by the height adjustment mechanism;
the bottom brace being positioned adjacent to a lower horizontal beam of the stand frame;
the handle grasp being positioned opposite to the bottom brace across the stand rack and;
the handle grasp being fixed onto the stand rack.

13. The guitar stand and mounting system as claimed in claim 1 comprises:
the fastening mechanism comprises an adjustable-length cantilever and a top edge hook;
the top edge hook being terminally connected to the adjustable-length cantilever and;
the adjustable-length cantilever being pivotally connected to the stand rack, opposite to the top edge hook.

14. The guitar stand and mounting system as claimed in claim 13 comprises:
the top edge hook comprises a hook adjustment mechanism and;
the hook adjustment mechanism being slidably mounted onto the adjustable length cantilever.

\* \* \* \* \*